(12) United States Patent
Kochi et al.

(10) Patent No.: US 7,409,931 B2
(45) Date of Patent: Aug. 12, 2008

(54) FORCED-AIR-COOLED ENGINE EQUIPPED WITH COOLING AIR GUIDE COVER

(75) Inventors: Hiroyoshi Kochi, Sagamihara (JP); Manabu Sekimukai, Sagamihara (JP); Yosuke Maruta, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/582,436

(22) Filed: Oct. 18, 2006

(65) Prior Publication Data
US 2007/0089692 A1    Apr. 26, 2007

(30) Foreign Application Priority Data
Oct. 18, 2005    (JP) .............................. 2005-302609

(51) Int. Cl.
F01P 1/02    (2006.01)
(52) U.S. Cl. ................................... 123/41.7; 123/41.56
(58) Field of Classification Search .............. 123/41.62, 123/41.6, 41.61
See application file for complete search history.

(56) References Cited

U.S. PATENT DOCUMENTS

| | | | | |
|---|---|---|---|---|
| 3,172,397 A | * | 3/1965 | Schmuck ................. | 123/41.62 |
| 3,236,215 A | * | 2/1966 | Eck et al. ................. | 123/41.05 |
| 3,841,278 A | * | 10/1974 | Frehe ....................... | 123/41.61 |
| 3,859,965 A | * | 1/1975 | Hatz et al. ................ | 123/41.7 |
| 4,515,111 A | * | 5/1985 | Vosmeyer et al. ........ | 123/41.61 |
| 4,633,823 A | * | 1/1987 | Haas et al. ............... | 123/41.61 |

FOREIGN PATENT DOCUMENTS

| | | |
|---|---|---|
| JP | 63-36776 | 3/1988 |
| JP | 64-47976 | 3/1989 |
| JP | 4-50911 | 12/1992 |
| JP | 2001-355561 | 12/2001 |
| JP | 2003-56408 | 2/2003 |

* cited by examiner

*Primary Examiner*—Noah Kamen
(74) *Attorney, Agent, or Firm*—Wenderoth, Lind & Ponack, L.L.P.

(57) ABSTRACT

A forced-air-cooled engine has a main blow-out opening provided to a back plate of a cooling fan cover at a position facing a cylinder part for blowing out cooling air for cooling a cylinder part and a secondary blow-out opening provided to the back plate at a position opposite to the main blow-out opening in regard to the crankshaft center for cooling a part of a crankcase part, wherein a cooling air guide cover is equipped which is composed of a cylinder air-guide cover part which guides air blown out from the main blow-out opening to flow to cool the cylinder part and cylinder head, and a top cover part which guides air blown out from the secondary blow-out opening to flow along a side face of the crankcase part to cool there and then flow into midstream of the cooling air flow blown out from the main blow-out opening and cooling the cylinder part and cylinder head.

7 Claims, 7 Drawing Sheets

FORCED-AIR-COOLED ENGINE EQUIPPED WITH COOLING AIR GUIDE COVER

BACKGROUND OF THE INVENTION

1. Field of the Invention

The present invention relates to a forced-air-cooled engine composed of a cylinder block integrated with a crankcase, which is a single block integrating a crankcase part and a cylinder part that extends aslant from the crankcase part, particularly to a cooling air guide cover for distributing the cooling air effectively to improve cooling of the engine.

2. Description of the Related Art

In a single cylinder, forced-air-cooled engine, with the air energized by the cooling fan attached to an end of the crankshaft being blown out from the opening of the fan cover, the air is guided to the cylinder and cylinder head having a plurality of cooling fins around their outer surfaces to flow through the spaces between the fins to cool the cylinder and cylinder head.

In Japanese Laid-Open Patent Application No. 2003-56408 an inclined cylinder type engine having a crankcase-integrated cylinder block is disclosed, with the cylinder block being composed of a crankcase part and a cylinder part cast in one piece. In this engine, in addition to a cylinder air-guide cover (air cover), a first exhaust air guide and a second exhaust air guide are provided for guiding the cooling air after cooling the cylinder to the carburetor to heat it in order to prevent occurrence of congelation in the carburetor.

However, the cylinder air-guide cover and exhaust air guide cover only the cylinder and cylinder head and do not cover the crankcase part to guide cooling air, and the crankcase part is cooled by natural cooling by the ambient air.

Another example of an inclined cylinder type, forced-air-cooled engine is shown in FIG. 7. In FIG. 7, a cylinder block 3 is a cast unit with a cylinder part 7 and a crankcase part 3A cast integrally, the cylinder part 7 extending aslant from the crankcase part 3A. A cylinder head 101 is attached on top of the cylinder part 7. A valve drive mechanism is provided on the cylinder head and covered by a cylinder head cover.

Reference numeral 103 is an exhaust outlet of the cylinder head 101, 104 is an ignition plug, 105 is a cylinder air-guide cover, 106 is a fuel hose connecting a fuel tank (not shown in the drawing) to a fuel filter (not shown in the drawing). Reference numeral 3a indicates a root part of the cylinder part 7 (connection part of the cylinder part to the crankcase part). Reference numeral 4 is an output shaft of a crankshaft, a cooling fan (not shown in the drawing) being attached to the end opposite to the output shaft 4 (front side) of the crankshaft. A fan cover covering the cooling fan is provided in its back plate with a secondary blow-out opening 1b and a main blow-out opening (not visible in the drawing) for blowing out air energized by the cooling fan. Cooling air 5 blown out from the main blow-out opening hits the cylinder part and cylinder head and is guided by the cylinder air-guide cover to flow through spaces between cooling fins thereof to cool them and flow out into ambient air. Cooling air 6 blown out from the secondary blow-out opening 1b hits a part 3b of a side wall of the crankcase part 3A, cools the part 3b of the crankcase part 3A, and diffuses into the ambient air. Therefore, the crankcase part is cooled only locally, and most of the crankcase part is left to be cooled naturally by the ambient air. As mentioned above, in an engine of this kind, priority is put on cooling the cylinder and cylinder head, and generally positive cooling of the crankcase part is not considered, although in the case of the example a part of the crankcase part is cooled by hitting the cooling air blown out from the secondary blow-out opening.

In engines of this kind, lube oil is accumulated inside the crankcase part 3A and splash lubrication is adopted, that is, the lube oil in the crankcase part 3A is splashed by means of a projecting portion provided to the connecting rod, and oil cooler is not provided. Cooling of lube oil is usually left to natural cooling via the crankcase part.

However, the amount of heat generated increases and the surface from which to release heat decreases as engines of this kind are small sized and high powered, so lube oil temperature tends to become higher. Particularly, under a high temperature environment, the temperature of lube oil rises excessively and durability of the engine is deteriorated. Further, in recent years, many component parts made of plastic material are used for weight saving, for facilitating manufacturing, and for cost saving, so it is required to lower the temperature of the surface of the engine as far as possible to evade an excessive temperature rise of these parts.

In engines of this kind, a fuel hose connecting a fuel tank mounted on top of the engine to a fuel filter mounted in a lower part of the engine often passes a space behind the cylinder part downstream of the cooling air flow. In this case, the fuel hose is heated by the cooling air increased in temperature by cooling the engine, and vapor lock tends to occur in the fuel hose. To prevent this, a heat shield plate is often provided between the fuel hose and the cylinder part. The fuel hose is usually made of elastic material and it shakes due to vibration and/or shaking of the engine, so it often happens that the fuel hose contact with adjacent parts relatively increased in temperature by the exhausting cooling air and damaged. When the fuel hose is damaged, fuel leaks and fire may occur. As a means to fix a fuel hose, Japanese Laid-Open Utility Model Application discloses a groove of semi-circular cross section for receiving the fuel hose on the end face of the crankcase part and cover the fuel hose by a hose cover.

However, with this art, it is not easy to form a groove of semi-circular cross section on the end face of the crankcase part.

SUMMARY OF THE INVENTION

To solve the problems mentioned above, the present invention proposes a forced-air-cooled engine equipped with a cooling air guide cover, the engine having a cylinder block which is composed of a crankcase part and a cylinder part connected into one block, a cooling fan being attached to an end of a crankshaft of the engine, a main blow-out opening being provided to a back plate of a fan cover covering the cooling fan at a position facing the cylinder part for blowing out cooling air for cooling the cylinder part, and a secondary blow-out opening being provided to the back plate at a position opposite to the main blow-out opening in regard to the crankshaft center for cooling a part of the crankcase part, wherein the cooling air guide cover is composed of a cylinder air-guide cover part which guides air blown out from the main blow-out opening to flow to cool the cylinder part and a top cover part which guides air blown out from the secondary blow-out opening to flow along a side face of the crankcase part to cool there and then flow into the cooling air flow cooling the cylinder part.

With this construction, the crankcase part of a small size forced air-cooled engine, of which a means to positively cool the crankcase part has not been adopted, can be effectively cooled. As the temperature of the crankcase part is relatively low compared with that of the cylinder part inside which combustion is performed, the cooling air which has cooled the crankcase part is lower in temperature than that which has cooled the cylinder part and cylinder head, so by allowing the cooling air which has cooled the crankcase part to participate in cooling the cylinder part and cylinder head by introducing this air to the cylinder part side, the air energized by the cooling fan can be utilized more effectively to cool the engine. The cooling air cooling the cylinder part and cylinder head increases in temperature as it flows downstream, and cooling of the cylinder part and cylinder head tends to be in the downstream zone. By allowing the air which has cooled the crankcase part and which is relatively low in temperature to flow into midstream of the cooling air cooling the cylinder part and cylinder head, cooling of the downstream zone of the cylinder part and cylinder head can be improved. As a result, temperature distribution in the cylinder in a circumferential direction becomes more even and deformation of the cylinder in a radial direction becomes more even resulting in reduced lube oil consumption.

Further, in an inclined cylinder type engine, surface area is larger in one side of the crankcase part than that in the other side, so, by cooling the side face of the crankcase part larger in area positively by allowing cooling air to flow along the surface, the crankcase part is cooled effectively and the temperature of lube oil inside the crankcase part can be reduced and affection by heat to members attached around the engine can be reduced. Therefore, a highly durable, reliable engine can be obtained.

It is preferable that the cooling air guide cover is made of heat resistant resin superior in absorption of vibration energy and large in resistance to heat transfer by injection molding. The top cover part and cylinder air-guide cover part respectively having an extending girdle part to butt against each other in a downstream zone behind the connecting part of the cylinder part and crankcase part, and engaging parts are formed at ends of the girdle parts to connect the top cover part and cylinder air-guide cover part.

By making the cooling air guide of plastic material, by injection molding, the cooling air guide cover can be provided with ease and at low cost, and in addition, engine noise can be reduced.

It is preferable that a channel or clamp or combination of them are provided on the back face of each of the connecting parts of the top cover part and cylinder air-guide part to fix and retain a fuel hose connecting a fuel tank to a fuel filter on the back faces of the connecting parts.

It is preferable that the top cover part of the cooling air guide cover is connected to the back plate of the fan cover and to a flange part provided at a back side end of the crankcase part by mortise and tenon joint and fixed by means of bolts to the cylinder block at key positions as necessary.

It is preferable that the top cover and cylinder air-guide cover has respectively a girdle part bent to extend across the cylinder air flow behind the connecting part of the cylinder part and crankcase part to be connected at the ends of the girdle parts by mortise and tenon joint and are fixed by means of bolts to the cylinder block at key positions as necessary. In this way, the number of positions to fix the top cover to the cylinder block by means of bolts can be reduced and assembling man-hour can be reduced.

It is preferable that a fuel hose connecting a fuel tank to a fuel filter is fixed to the back face of the girdle parts of the top cover and cylinder air-guide cover, whereby cooling air increased in temperature after cooling the engine does not contact directly with the fuel hose.

By retaining the fuel hose connecting the fuel tank to the fuel filter securely on the back faces of the girdle parts extending from the top cover and cylinder air-guide cover behind the connecting part of the cylinder part and crankcase part, cooling air increased in temperature by cooling the engine does not contact directly with the fuel hose and occurrence of fuel hose damage due to repeated contact of the fuel hose with members near the hose due to vibration and/or shaking of the engine.

The cooling air guide cover constructed as mentioned above can be easily assembled to the engine in a short time and contributes to largely reduce assembling man-hour. A forced-air-cooled engine equipped with the cooking air guide is increased in durability, reduced in lube oil consumption, suppressed I vibration of the cover resulting in reduced engine noise.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 1:
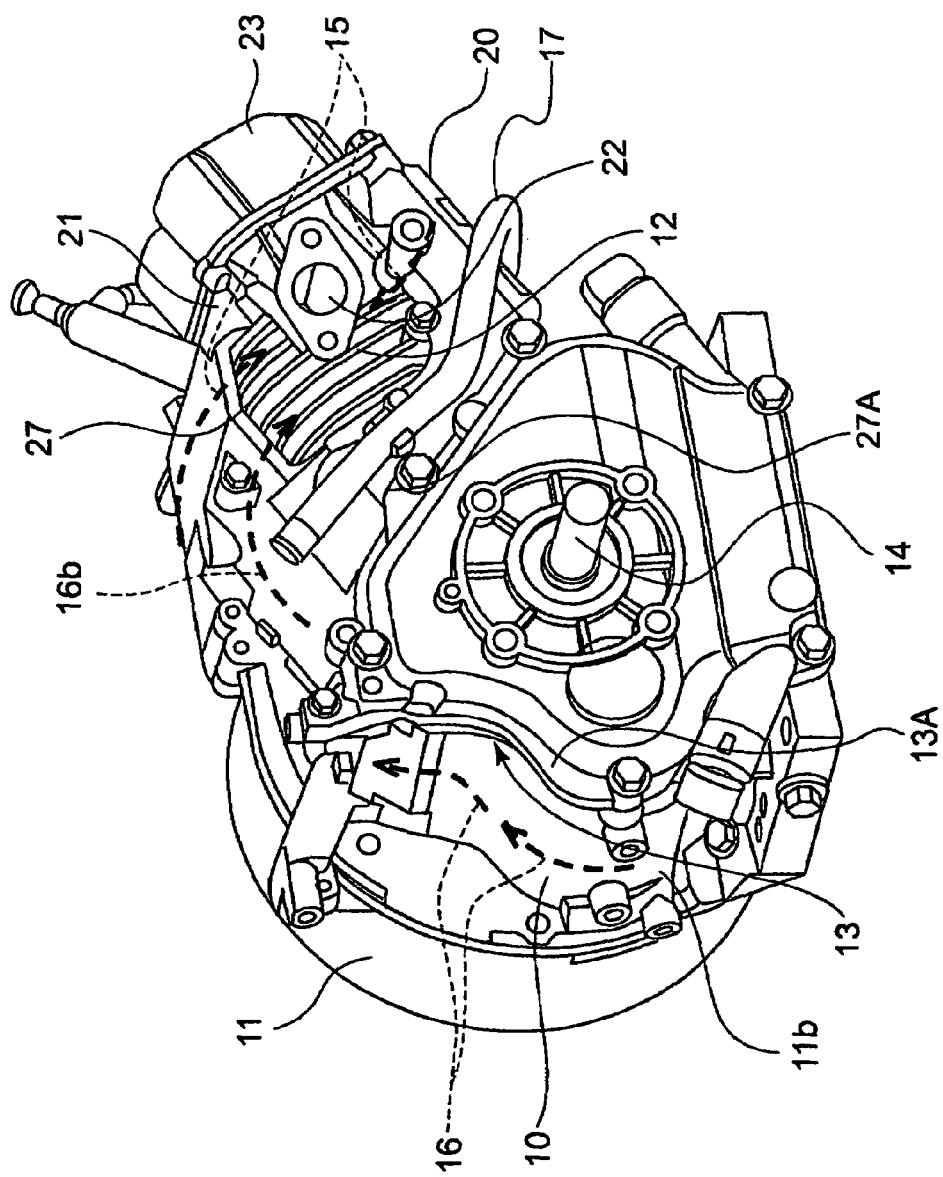
FIG. 1 is a perspective view of an engine to which the present invention is applied, and cooling air flow is shown.

FIG. 1 is a perspective view of an engine to which the present invention is applied with the fuel tank, air cleaner, muffler, controlling device, etc. omitted, and cooling air flow is shown.

Figure 6:
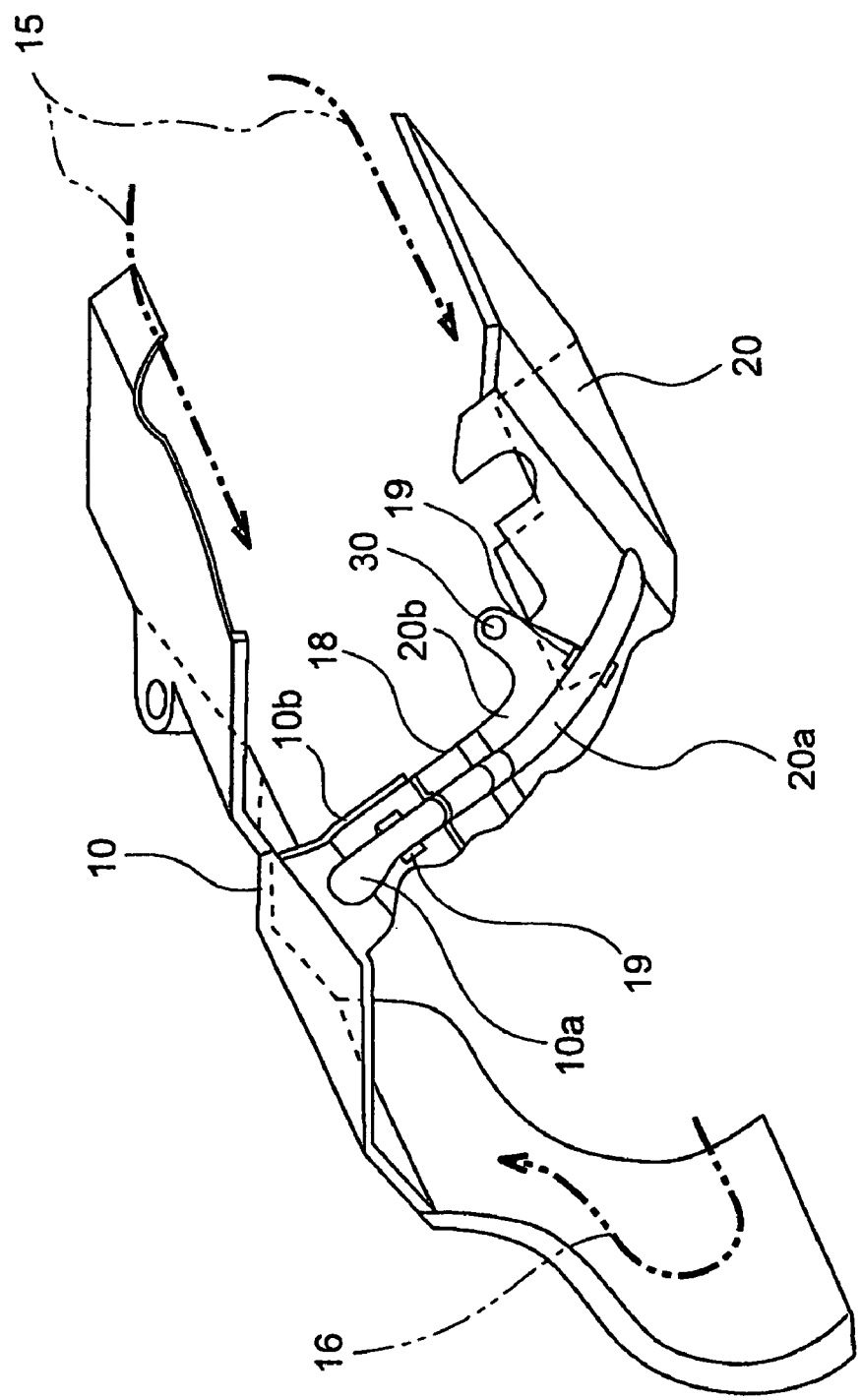
FIG. 6 is a perspective view of the cooling air guide cover of the present invention showing the configuration thereof schematically with cooling air flow being shown.
Figure 7:
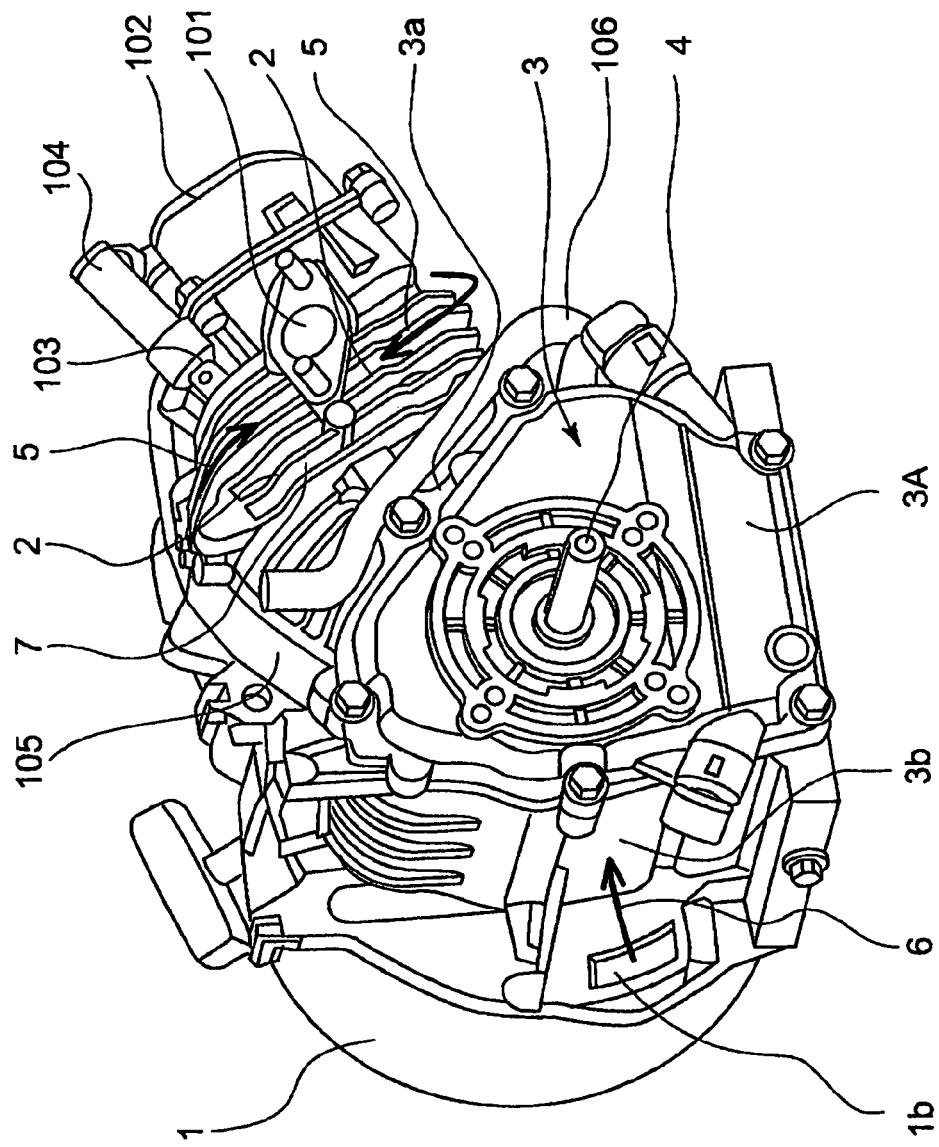
FIG. 7 is a perspective view of a conventional engine, and cooling air flow is shown.

In FIG. 1, reference numeral 13 is a crankcase-integrated cylinder block composed of a cylinder part 27 and a crankcase part 13A formed into one block. Reference numeral 21 is a cylinder head fixed on top of the cylinder part 27, 12 are cooling fins of the cylinder part including cooling fins of the cylinder head. Reference numeral 22 is an exhaust outlet of the cylinder head, 23 is a cylinder head cover, and 24 is an ignition plug. Reference numeral 14 is an output shaft of the rear side of a crankshaft, a cooling fan (not shown in the drawing) is attached to the end opposite to the output shaft (front side) of the crankshaft. Reference numeral 11 is a fan cover, the fan cover being attached with its back plate to the cylinder block 13. Reference numeral 17 is a fuel hose connecting a fuel tank and a fuel filter (both not shown in the drawing), and 20 is a cylinder air-guide cover. Reference numeral 10 is a top cover, which is shown in FIG. 6 in a perspective view. The top cover 10 covers a left side surface and upper surface in FIG. 1 of the crankcase part 13A and further extends covering the cooling fins to the upper most cooling fin of the cylinder head. The top cover 10 extends laterally from the back plate of the fan cover 11 to the right side (output shaft side) end part of the crankcase part 13A, the right side end of the top cover 10 being connected to a flange part provided to the right side end part of the crankcase part 13A by mortise and tenon joint, and the left side end of the top cover 10 being connected to the back plate of the fan cover 11 by mortise and tenon joint. Space for allowing cooling air to flow through is secured between the left side surface and upper surface of the crankcase part 13A and left side peripheries of the cooling fins. A main blow-out opening 11a (see FIG. 4) is opened in the back plate of the fan cover 11 at a position facing the cooling fins of the cylinder part 27 and cylinder head 21 and a secondary blow-out opening lib is opened in the back plate of the fan cover 11 at a position facing the lower part of the space between the left side surface of the crankcase part 13A and the top cover 10.

Figure 2:
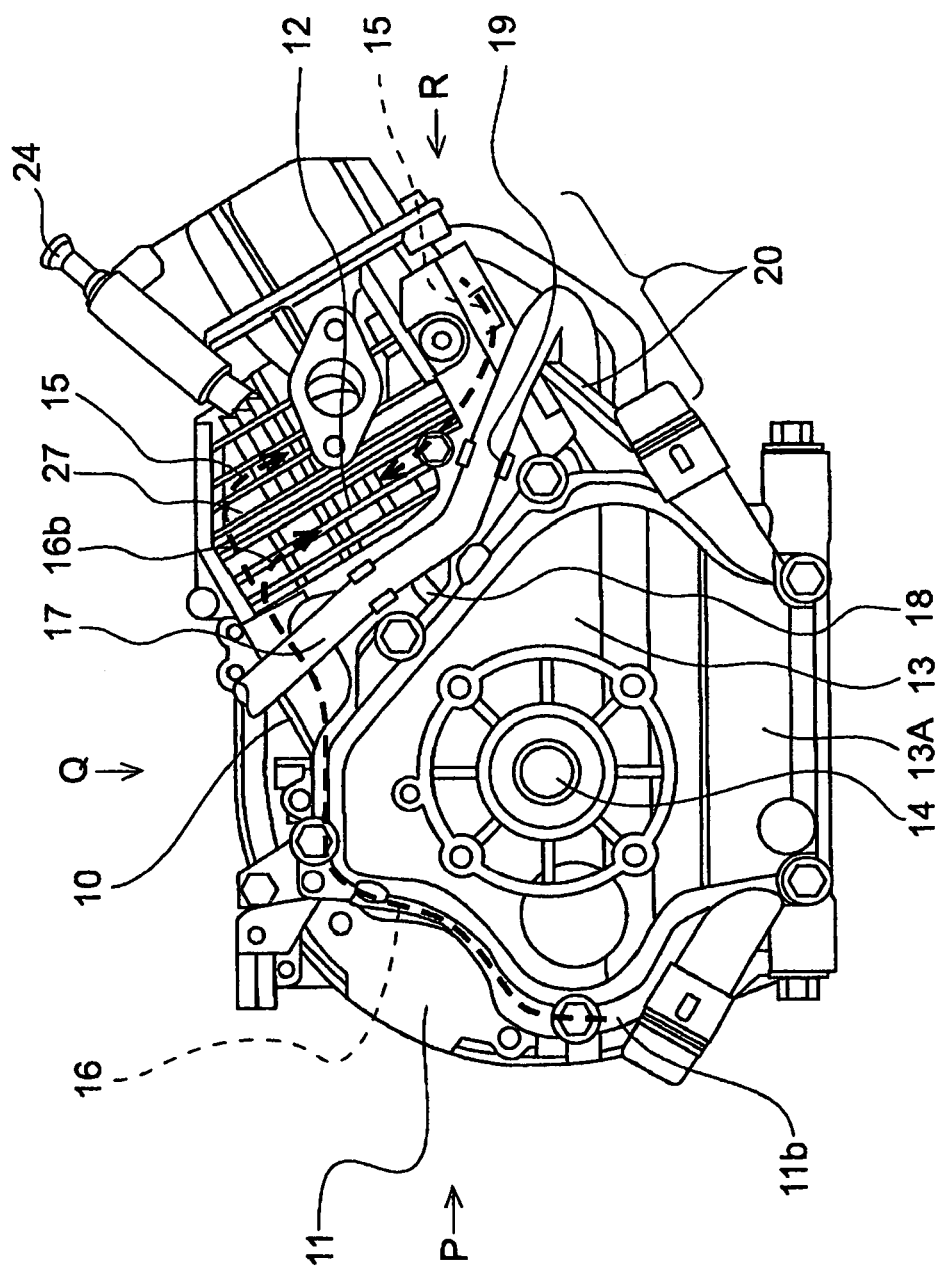
FIG. 2 is a rear view of the engine of FIG. 1 viewed from the output shaft side with cooling air flow being shown.

FIG. 2 is a rear view of the engine of FIG. 1 viewed from the output shaft side, and the same constituent parts as those of FIG. 1 are denoted by the same reference numerals. In FIG. 2, reference numeral 19 is a hose clamp for fixing the fuel hose 17 to the connecting part of the cylinder air guide cover 20 and top cover 10, and reference numeral 18 indicates connecting ends of the connecting part. These will be detailed later in the explanation of FIG. 6.

Figure 3A:
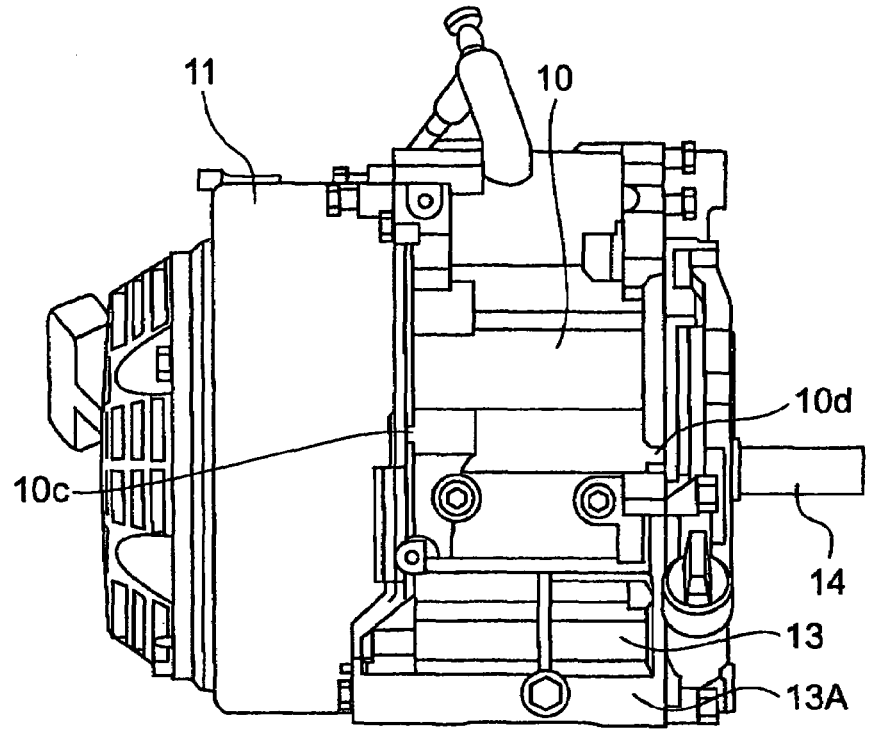
FIG. 3(A) is a side view viewed in the direction of the arrow P in FIG. 2.
Figure 3B:
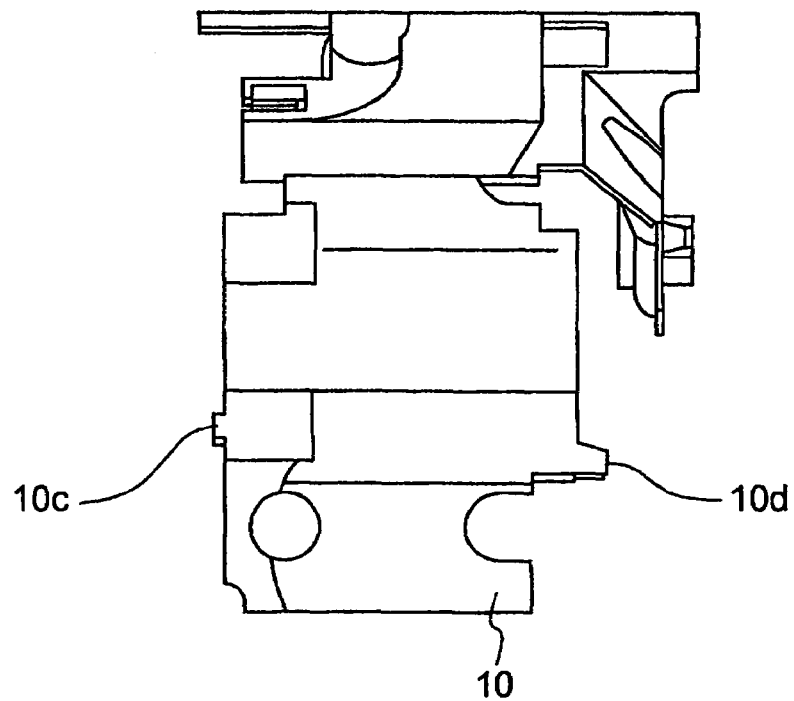
FIG. 3(B) is a front view of the top cover removed from the engine and viewed in the same direction P in FIG. 3(A).

FIG. 3(A) is a side view viewed in the direction of the arrow P in FIG. 2, and the same constituent parts as those of FIGS. 1-2 are denoted by the same reference numerals. FIG. 3(B) is a front view of the top cover removed from the engine and viewed in the same direction P in FIG. 3(A). A tenon 10c and tenon 10d for connecting the top cover 10 to the back plate of the fan cover 11 and to the flange part at rear end side (right side) of the crankcase part 13A by mortise and tenon joint are shown in FIGS. 3(A) and (B). The tenon 10c is inserted into a mortise provided to the back plate of the fan cover and tenon 10d is inserted into a mortise provided to the rear side end flange part of the crankcase part 13A.

Figure 4:
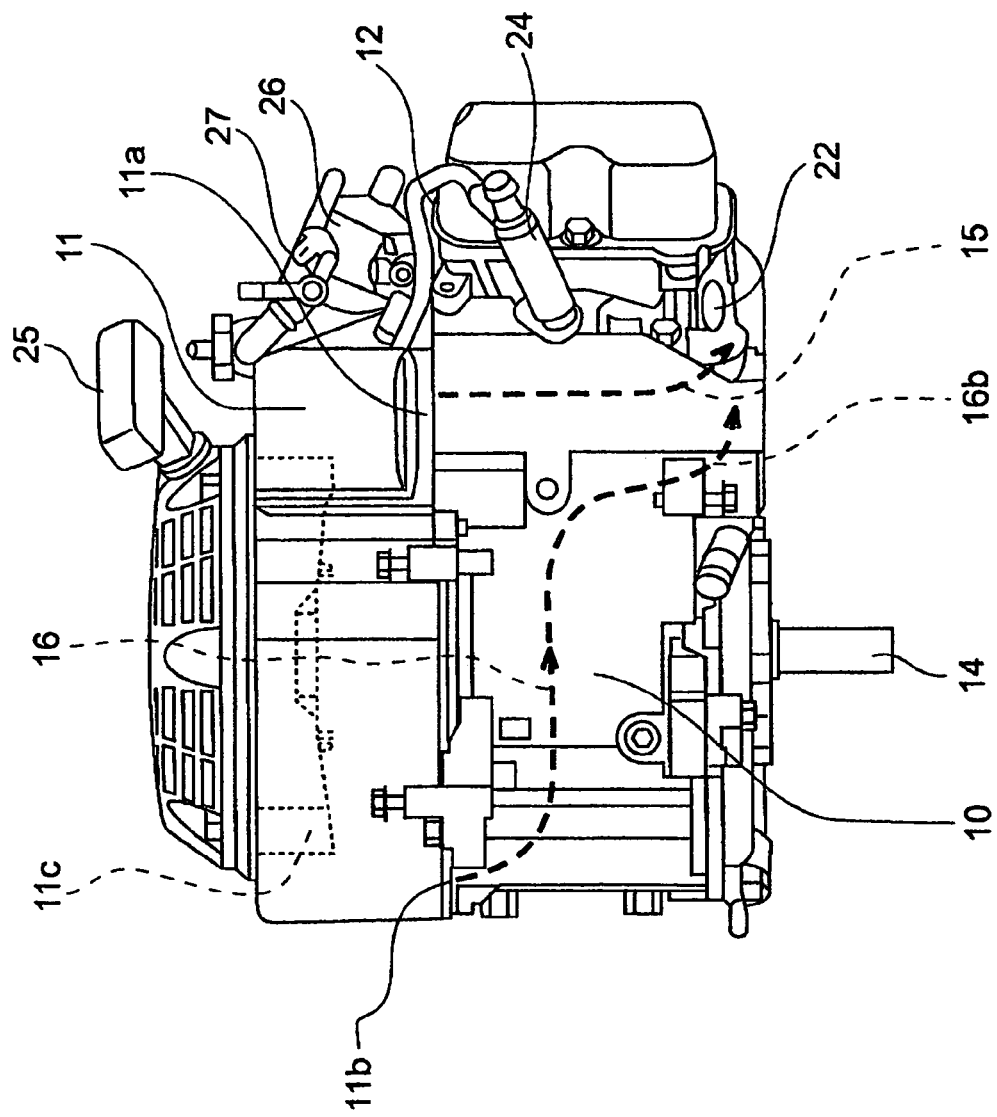
FIG. 4 is a plan view viewed in the direction of the arrow Q in FIG. 2 with cooling air flow being shown.

FIG. 4 is a plan view viewed in the direction of the arrow Q in FIG. 2 with the cooling air flow being shown, and the same constituent parts as those of FIGS. 1-3 are denoted by the same reference numerals. In FIG. 4, reference numeral 25 is a handle for manually starting the engine, 26 is a carburetor, and 27 indicates control links. Reference numeral 11c indicates a cooling fan attached to the crankshaft at the front end.

Figure 5A:
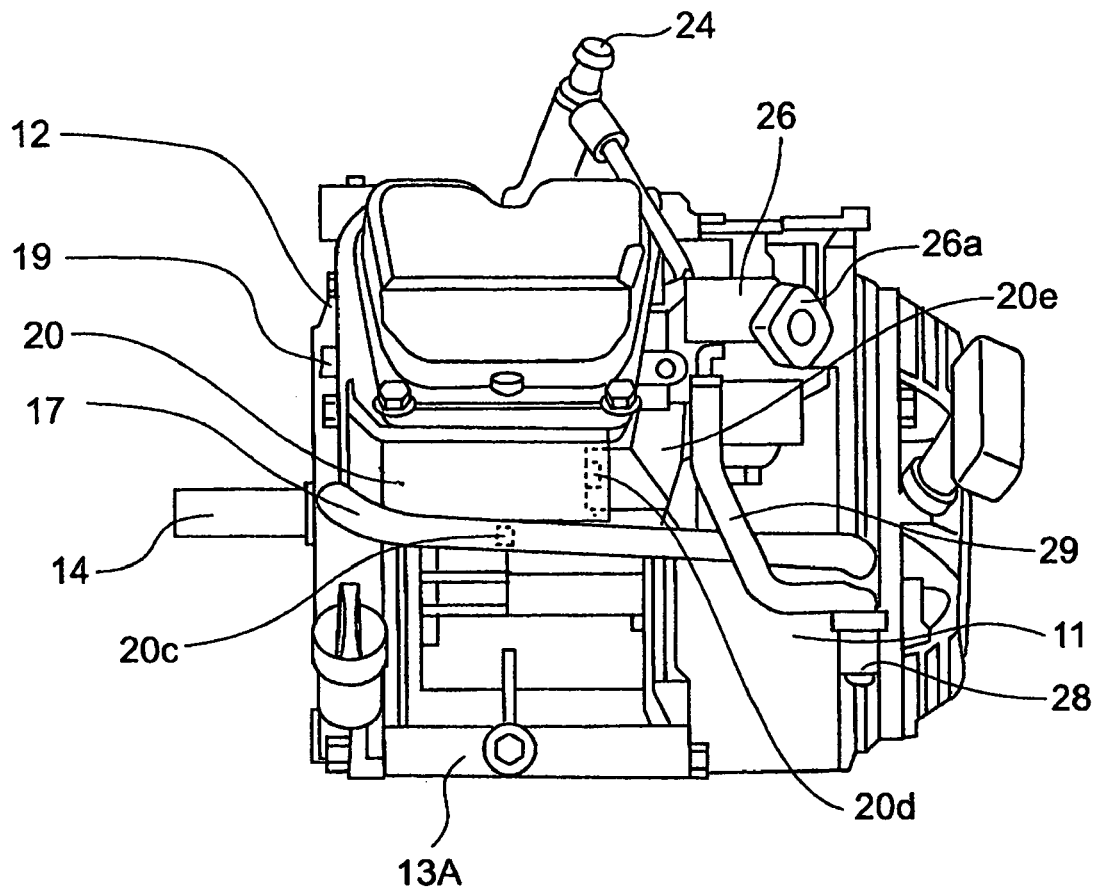
FIG. 5(A) is a side view viewed in the direction of the arrow R in FIG. 2.

FIG. 5(A) is a side view viewed in the direction of the arrow R in FIG. 2, and the same constituent parts as those of FIGS. 1-4 are denoted by the same reference numerals. In FIG. 5(A), reference numeral 26a is a flange of the carburetor 26 for connecting an air intake pipe (not shown in the drawing). Reference numeral 28 is a fuel filter. Fuel sent by gravity from a fuel tank (not shown in the drawing) via the fuel hose 17 to the fuel filter 28 is supplied to the carburetor via a fuel pipe 29.

Reference numeral 26a is a flange of the carburetor for connecting an intake pipe (not shown in the drawing). Reference numeral 20c is a front guide member of the cylinder air-guide cover 20, the front guide member 20c being connected by mortise and tenon joint to composed the cylinder air-guide cover 20.

Figure 5B:
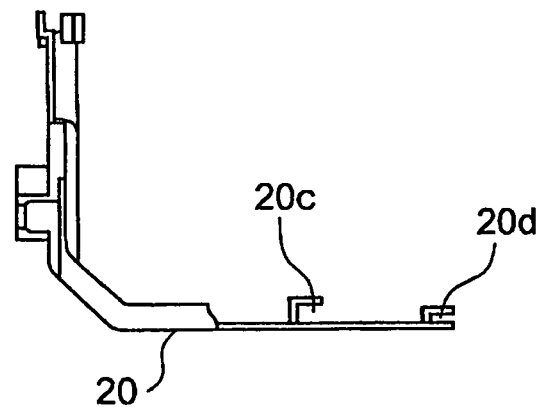
FIG. 5(B) is a top view of the cylinder air-guide cover removed from the engine and viewed from above.

FIG. 5(B) is a top view of the cylinder air-guide cover removed from the engine and viewed from above. In FIG. 5(B), members to provide a mortise 20c and 20d to the cylinder air-guide cover 20 are shown. The mortise 20c is engaged with a tenon member provided on the surface of the side wall of the crankcase part 13A to fix the cylinder air-guide cover 20 to the cylinder block and the front guide member 20e is engaged with the mortise 20d to compose the front guide part.

FIG. 6 is a perspective view of the cooling air guide cover of the present invention showing the configuration thereof schematically with the cooling air flow being shown, and the same constituent parts as those of FIGS. 1-5 are denoted by the same reference numerals. Girdle parts 10b and 20b extend from the top cover 10 and cylinder air-guide cover 20 respectively bending across the downstream zone of the cooling air flow on the surface of the crankcase part behind the connecting part of the cylinder part to the crankcase part, and these girdle parts 10b and 20b are connected by mortise and tenon joint at end parts 18 thereof to compose a cooling air guide cover. Grooves 10a and 20a of preferably circular arc cross section are formed on the back faces (downstream of the cooling air flow 15) of the girdle parts 10b and 20b for receiving the fuel hose 17, a pair or pairs of detents 19 (clamp part) protrude from both sides across the groove with the distance between the pair of detents being smaller than the diameter of the fuel hose, and the fuel hose 17 can be stably retained in the grooves 10a and 20a pinched by the detents by pushing the hose into the grooves.

It is permissible not to provide the grooves, instead a pair or pairs of detents are provided at flat faces of the girdle parts. In the case the groove is provided, there is an advantage in that the detents can be reduced in height and fear of breakage of the detents is eliminated. Clamps well known in the art may be used instead of the detents. Reference numeral 29 and 30 are bolt-holes for fixing the top cover 10 and cylinder air-guide cover 20 to the cylinder block 13 by means of bolts. Although two holes are provided, the number of holes may be increased as necessary.

Cooling air flow is shown by arrows with bold broken line in FIGS. 1, 2, and 4, and by arrows with a chain line in FIG. 6.

Referring to FIGS. 1, 2, 4, and 6, cooling air flow will be explained hereunder.

Cooling air 15 blown out from the main blow-out opening 11a opened in the back plate of the fan cover 11 flows through between fins 12 of the cylinder part 27 and cylinder head 21 while cooling the cylinder and cylinder head to be exhausted backward from the engine. At the R-side in FIG. 2 of the cylinder and cylinder head, the cooling air 15 is guided by the cylinder air-guide cover 20.

On the other hand, cooling air 16 blown out from the secondary blow-out opening 11b opened in the back plate of the fan cover 11 enters the space between the top cover 10 and a side surface of the crankcase part 13A. The top cover 10 is connected to the back plate of the fan cover 11 by means of the tenon 10c and to the rear side flange part of the crankcase part 13A by means of the tenon 10d, and the space between the top cover 10 and the side surface of the crankcase part 13A is closed at the left, right, end lower end part, and open only towards the cylinder part and cylinder head side. Therefore, the cooling air 16 flows upwards along the side surface of the crankcase part. By the way, it is permissible that the closing at the left, right, end lower end part of the top cover 10 is not perfect, because, even if little leakage of the cooling air 16 occurs, the cooling air flows upwards along the surface of the crankcase part. The cooling air 16 flows guided by the top cover 10 upwards and hits the cylinder part and cylinder head as shown by air flow 16b, where the cooling air 16b joins a part of the cooling air 15 blown out from the main blow-out opening 11a to be exhausted backward from the engine together with the cooling air 15. That is, the cooling air blown out from the secondary blow-out opening lib cools the one side and upper part of the crankcase part 13A, then enters the space between the cooling fins 12 to participate in cooling the cylinder part and cylinder head. By determining properly the ratio of the opening area of the secondary blow-out opening 11b to that of the main blow-out opening 11a, the rate of flow rate of the cooling air 16 to that of the cooling air 15 can be optimized for total cooling of the engine.

As shown in FIG. 6, the cooling air 15 blown out from the main blow-out opening 11a flows in a backward direction (in left direction in the drawing), and the cooling air 16 flows upward along the one side of the crankcase part, then flows into the cooling air flow 15 and then in backward direction together with the cooling air 15, the cooling air does not contact directly with the fuel hose 17 retained on the back face of the girdle parts 10b and 20b of the top cover 10 and cylinder air-guide plate 20, and the fuel hose 17 is securely fixed on the girdle parts, so that the fuel hose will not be shaken due to vibration and/or shaking of the engine, and the occurrence of damage of the fuel hose can be positively prevented.

The top cover 10 and cylinder air-guide cover are preferably made of heat resistant resin by injection molding, by which the cooling air guide which is complicated in configuration can be provided with ease and at low cost, and in addition engine noise can be reduced.

What is claimed is:

1. A forced-air-cooled engine equipped with a cooling air guide cover, the engine having a cylinder block which comprises:
   a crankcase part and a cylinder part connected into one block;
   a cooling fan being attached to an end of a crankshaft of the engine;
   a fan cover arranged so as to cover said cooling fan;
   a main blow-out opening being provided at a back plate of said fan cover at a position facing said cylinder part for blowing out cooling air for cooling said cylinder part; and
   a secondary blow-out opening being provided at said back plate at a position opposite to said main blow-out opening with respect to a crankshaft center for cooling a part of said crankcase part,
   wherein said cooling air guide cover is comprised of a cylinder air-guide cover part which guides air blown out from said main blow-out opening to flow so as to cool said cylinder part, and a top cover part which guides air blown out from said secondary blow-out opening to flow along a side face of said crankcase part so as to cool said side face of said crankcase part and then to flow into the flow of air from said main blow-out opening which cools said cylinder part.

2. A forced-air-cooled engine equipped with a cooling air guide cover according to claim 1, wherein said cooling air guide cover is made of heat resistant resin superior in absorption of vibration energy and large in resistance to heat transfer by injection molding, said top cover part and said cylinder air-guide cover part each having an extending girdle part so as to butt against each other in a downstream zone behind a connecting part of said cylinder part and crankcase part, and engaging parts are formed at respective ends of said girdle parts so as to connect said top cover part and said cylinder air-guide cover part.

3. A forced-air-cooled engine according to claim 2, wherein at least one of a channel and a clamp is provided on a back face of each of said engaging parts of said top cover part and said cylinder air-guide part so as to fix and retain a fuel hose connecting a fuel tank to a fuel filter.

4. A forced-air-cooled engine according to claim 1, wherein said top cover part of said cooling air guide cover is connected to said back plate of said fan cover and to a flange part provided at a back side end of said crankcase part by a mortise and tenon joint and fixed by way of bolts to the cylinder block at key positions.

5. A forced-air-cooled engine according to claim 4, wherein said top cover part and said cylinder air-guide cover part has each have a girdle part bent so as to extend across the cylinder part air flow behind a connecting part of said cylinder part and said crankcase part so as to be connected at ends of said girdle parts by a mortise and tenon joint and are fixed by means of bolts to the cylinder block at key positions.

6. A forced-air-cooled engine according to claim 5, wherein a fuel hose connecting a fuel tank to a fuel filter is fixed to a back face of said girdle parts of said top cover and said cylinder air-guide cover, whereby cooling air increased in temperature after cooling the engine does not contact directly with said fuel hose.

7. A forced-air-cooled engine according to claim 1, wherein said cylinder block is a crankcase-integrated cylinder block with said cylinder part extending from said crankcase part aslant toward a horizontal direction from a direction vertical relative to a base face of said crankcase part.

* * * * *